United States Patent [19]
Daggett et al.

[11] Patent Number: 5,504,454
[45] Date of Patent: Apr. 2, 1996

[54] DEMODULATOR FOR POWERLINE CARRIER COMMUNICATIONS

[75] Inventors: Kenneth E. Daggett, Murrysville; Dirk J. Boomgaard, Monroeville, both of Pa.

[73] Assignee: Westinghouse Elec. Corp., Pittsburgh, Pa.

[21] Appl. No.: 380,283

[22] Filed: Jan. 30, 1995

[51] Int. Cl.$^6$ .................................................. H03D 3/18
[52] U.S. Cl. ........................... 329/304; 329/310; 375/283; 375/328; 375/330; 455/33; 455/337
[58] Field of Search ..................................... 329/304, 310; 375/283, 308, 324, 328, 330, 331; 360/29; 455/3.3, 23, 42, 110, 214, 337; 20/30

[56] References Cited

U.S. PATENT DOCUMENTS

| | | | |
|---|---|---|---|
| 3,980,824 | 9/1976 | Lamb et al. | 375/283 |
| 4,558,284 | 12/1985 | Zaidenweber | 329/343 |
| 4,595,684 | 3/1986 | Stamm | 329/310 X |
| 4,618,830 | 10/1986 | Mori et al. | 329/310 X |
| 4,807,251 | 2/1989 | Shibano | 375/308 X |

*Primary Examiner*—David Mis

[57] ABSTRACT

A method for demodulating the carrier signal of powerline communication networks. The method involves demodulating an HDLC data body that had been modulated through differential phase shift keyed modulation. Under the method, the data body is split with data input into a single bit digital delay circuit which outputs a delayed or "previous" binary data bit. A "present" binary data bit is input to one input of an XNOR circuit and the previous binary data bit is input into a second input of the XNOR circuit. When the present binary data bit and the previous binary data bit have unlike phases the XNOR circuit outputs a first binary data bit value. When the present binary data bit and the previous binary data bit have like phases, the XNOR circuit outputs a second binary data bit value. Preferably, the demodulated data is input into a post detection filter. The demodulation method also preferably involves the step of processing the demodulated data through a receive data correlator, a data body state machine and a variable divide counter.

16 Claims, 4 Drawing Sheets

DEMODULATOR FOR POWERLINE CARRIER COMMUNICATIONS

BACKGROUND OF THE INVENTION

1. Field of the Invention

The invention relates generally to communication networks. More particularly, the invention relates to methods and apparatus for utilizing AC powerlines as a communications media in such networks.

2. Description of the Prior Art

AC electrical wiring is already present in building structures to serve the building's power distribution needs. If this existing wiring could also serve as a communication media, it would provide a cost effective alternative for implementing local area communication networks. If such existing wiring could become high speed, reliable and cost effective as a communication media, the door would be opened for the development of many new applications. However, many hindrances have prevented the extensive use of powerline carrier technology in general purpose communication applications. Because of problems associated with communication speed, error rates, and implementation costs, AC powerlines have not had wide spread acceptance as a communications carrier. Others have attempted to solve these problems associated with powerline carriers. However, the prior art has not developed a cost effective implementation of high performance powerline carrier communication systems.

Demodulation of carrier data in wireless non-synchronized systems usually requires three forms of synchronization. First, proper reception of the message sometimes, especially when there are only a few carrier cycles per bit, requires carrier synchronization. A local carrier signal must be generated and synchronized to the received carrier signal. Secondly, proper demodulation always requires the receiver to determine the received data bit boundaries. This is referred to as bit synchronization. Thirdly, the receiver must determine the specific boundaries associated with each byte. This is referred to as byte synchronization. Proper packet reception requires achieving synchronization within or at the end of the preamble (the preamble consists of a specific data sequence preceding the packet body). The preamble serves as a signal to the receiver that a packet of information is being sent.

Powerline noise and other anomalies can cause incorrect synchronization. This in turn results in either incorrectly detecting the start of the data within the packet, or conversely not properly detecting the preamble. In either case the entire packet is lost. And often, incorrect detection of the start of the packet results in the loss of additional packets.

SUMMARY OF THE INVENTION

The present invention permits the demodulation of a carrier signal in powerline communication networks. This method involves demodulating an HDLC data body that had been modulated through differential phase shift keyed modulation. Under the method, the data body is split with data input into a single bit digital delay circuit which outputs a delayed or "previous" binary data bit. The data body (a "present" binary data bit) is input to one input of an XNOR circuit. The previous binary data bit is input into a second input of the XNOR circuit. When the present binary data bit and the previous binary data bit have unlike phases (indicating a phase change), the XNOR circuit outputs a first binary data bit value (preferably a logical "0"). When the present binary data bit and the previous binary data bit have like phases (indicating no phase change), the XNOR circuit outputs a second binary data bit value (preferably a logical "1"). Preferably, the demodulated data is input into a post detection filter. The post detection filter preferably comprises a two stage RC filter having a time constant for each stage of approximately one-quarter the bit time.

The demodulation method also preferably involves the step of processing the demodulated data through a receive data correlator, a data body state machine and a variable divide counter.

The present invention is incorporated in inexpensive circuity preferably implemented in the form of an Application Specific Integrated Circuit (ASIC). The ASIC is utilized in conjunction with other inexpensive circuitry that is present in the LSI form already and is inside of SCC devices that can transmit HDLC. Using the fact that the flag characters are unique to the message, given packet lengths do not have to be specified directly and the packet lengths can be changed depending upon the performance of the communications network, i.e, the power line.

Other objects and advantages of the invention will become apparent from a description of certain present preferred embodiments thereof shown in the drawings.

DETAILED DESCRIPTION OF THE PREFERRED EMBODIMENTS

The invention permits the demodulation of a carrier signal in powerline communication networks. The demodulation method and apparatus are implemented in a network system that combines HDLC communication protocol frame format with DPSK modulation for communicating information over a powerline 12 that is connected to a 120 Volt power supply 14. This approach is implemented by a preferred LAN Controller. Both the network communication approach and the controller are also described in copending application Westinghouse Electric Co. Case No. 58,533, which is herein incorporated by reference.

The hardware for the LAN Controller 10 is preferably an enclosure measuring approximately 5 inches by 3 inches by 2 inches. The package includes an integral, 120 Volt electrical plug. As such, the Controller 10 plugs directly into any standard AC electrical outlet prevalent in the United States and Canada.

Figure 1:
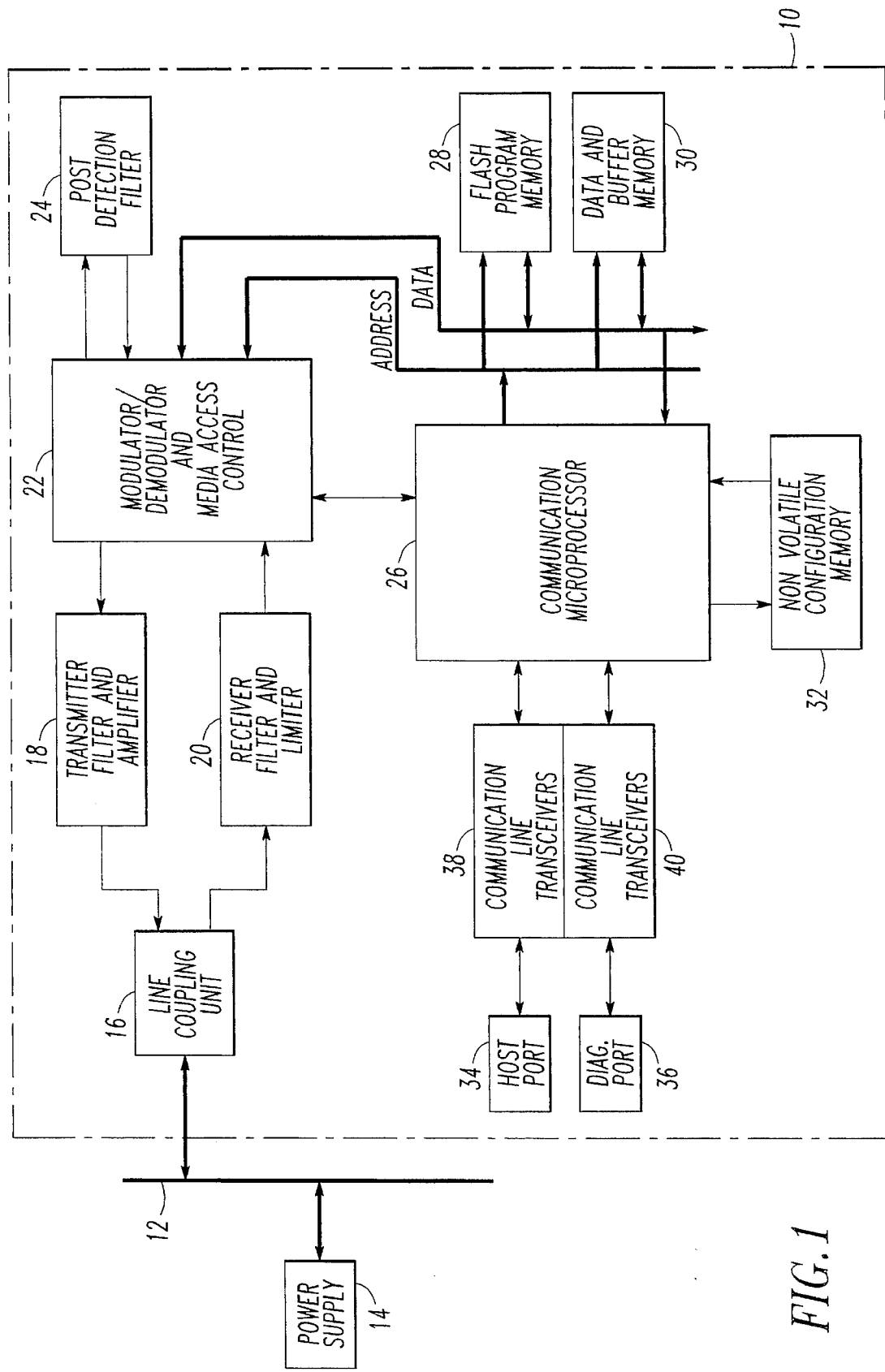
FIG. 1 is a functional block diagrammatic view of the preferred controller.

FIG. 1 provides a block diagram which illustrates the main elements of the LAN Controller 10. The Controller 10 comprises two communication environments. A shared media, or data highway, which physically consists of the 120 Volt AC powerlines 12, comprises the first communication environment. A host port 34 for communicating digitized information embodies the second communication environment. A Communication Microprocessor 26 and related peripherals (described in more detail below) furnish the mechanism for bridging the communication requirements for the two environments.

The Controller 10 is implemented as part of or is otherwise connected to a host device (not shown). Each Controller 10 operates strictly as a transparent communication device, providing the mechanism for connecting the host device to the powerline media 12. Any and all information supplied to the Controller 10 via the host port 34 is packetized and transmitted via the powerline media 12. Similarly, packetized information received via the network powerline media 12 is checked for communication errors, and all error free information is transmitted to the host device through the host port 34 (described in greater detail below). The host device associated with any given node may be either a network master or a network slave.

The Controller 10 utilizes a Line Coupling Unit 16 that allows coupling of the high frequency signal onto and from the powerline 12. The transmitted information travels to the Line Coupling Unit 16 through a transmitter, designated Transmitter Amplifier and Filter 18 in FIG. 1. The Line Coupling Unit 16 consists of two capacitors and a one-to-one isolation signal transformer (not shown). One of the capacitors is connected between the 120 Volt AC powerline 12 and the isolation transformer. The other capacitor is connected between the secondary of the isolation transformer and the remainder of the LAN Controller circuitry.

The information received through the powerline carrier 12 from the Line Coupling Unit 16 travels through a receiver designated as Receiver Filter and Limiter 20 in FIG. 1. Powerline carrier systems entail a signal frequency spectrum which contains all the useful communication information. In the presently preferred system, this information is contained within a narrow band of the frequency spectrum. The Receiver filter is thus a narrow band system which allows a compromise between providing the required degree of rejection of noise while allowing a phase change to be coupled through the Receiver filter. The theoretical bandwidth of a BPSK system is equal to one half the baseband data rate. This bandwidth is centered about the carrier frequency. The present system uses a carrier frequency of approximately 76.8 kHz. The carrier is derived from a baseband data rate of 19.2 kbps with four carrier cycles per data bit. The actual bandwidth must be somewhat greater than the theoretical minimum in order to accommodate the phase changes associated with the transmission of "0"s. Modulation with only a few carrier cycles per bit necessitates high signal fidelity in passing phase changes through the Receiver bandpass filter. It is highly desirable to pass the phase change through the Receiver filter within one carrier cycle. Establishing the proper filter characteristics which permit the phase changes to be passed through the Receiver filter in one carrier cycle without also passing out of band noise is essential for robust receiver operation. This is especially true in a powerline carrier system because of the large amplitude disparity between carrier signal and noise levels.

Figure 3:
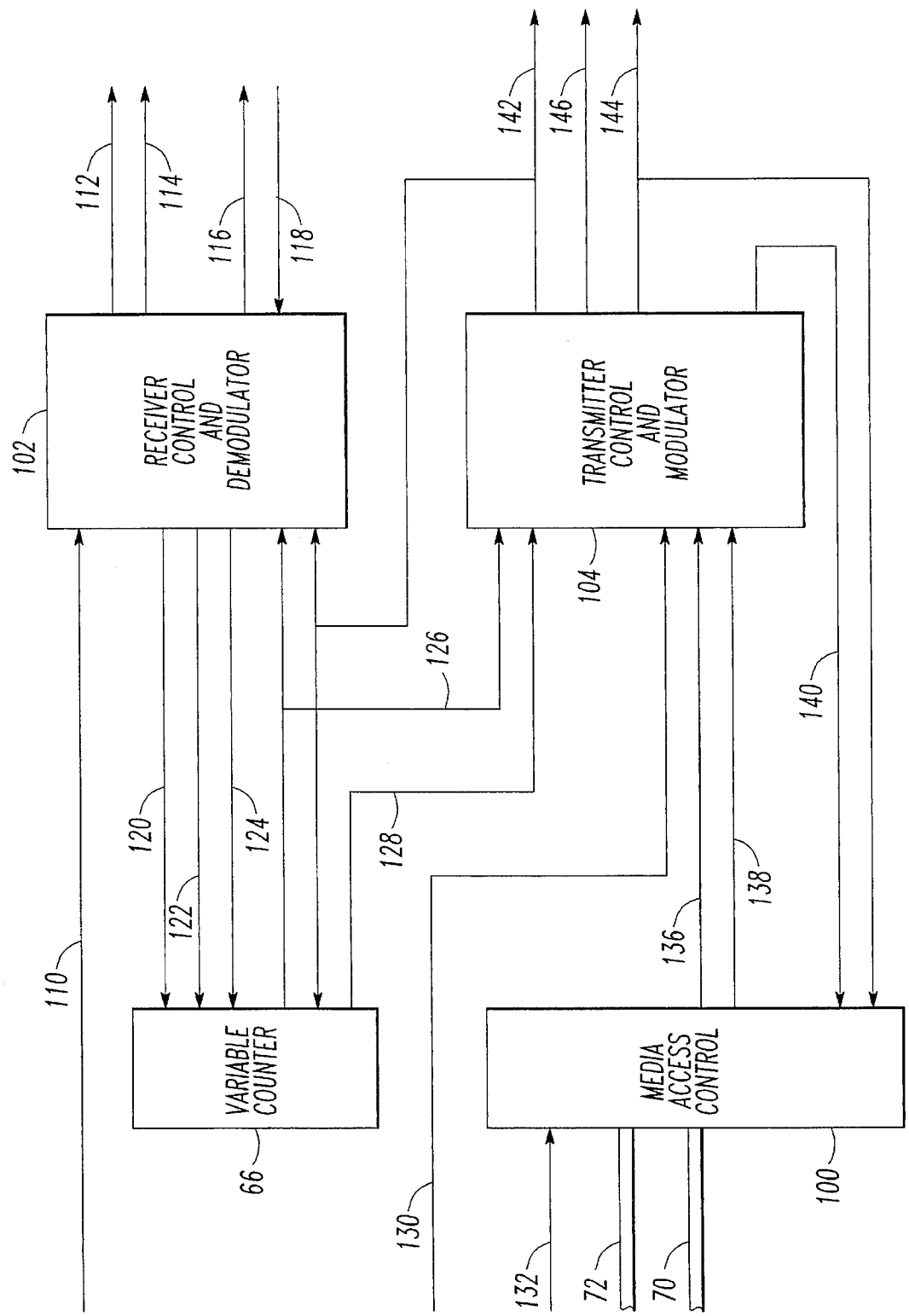
FIG. 3 is a functional block diagrammatic view of the preferred modulator/demodulator and media access control.

The Receiver Limiter converts the sinusoidal Receiver filter output into a digital signal. The limiter performs the function of zero crossing detection which means to determine where zeros occur in time. Maintaining signal integrity is essential in performing this limiting function. Deviations from the ideal 50% square wave duty cycle representation of the sinusoidal signal decreases the probability of correctly demodulating the signal. The digital, hard limited output, provides the received carrier signal input to the Demodulator. The output from the Limiter is a 5 Volt logic signal that is representative of the receive carrier signal. Received information that exits the Receiver Filter and Limiter 20 travels to the Demodulator and Media Access Control 22. Similarly, information passes through the Modulator and Media Access Control 22 before it travels to the Transmitter Filter and Amplifier 18. The logic associated with the Modulator/Demodulator and Media Access Control 22 (designated in FIG. 1 as a single block 22) is preferably implemented inside a RAM-based Field Programmable Gate Array (FPGA), so that it can be reconfigured at any time. A functional block diagram of the Modulator/Demodulator and Media Access Control 22 is shown in FIG. 3. As can be seen in FIG. 3, a number of functional elements contribute to the functions performed by the Modulator/Demodulator and Media Access Control 22. A Receiver Control and Demodulator 102, a Transmitter Control and Modulator 104, a Media Access Control 100 and a Variable Counter 66 each contribute to these function. The inner relationship between these various functional components will be described in more detail below.

The transmit carrier signal output 146 from the Modulator 104, which is a digital signal, is connected to the Transmitter filter. The Transmitter filter reduces the high harmonic content of this essentially square wave signal before the signal is coupled to the powerline 12. The Transmitter amplifier is a voltage amplifier, in which the output impedance is approximately zero ohms.

In a system having a large number of nodes, the Transmitter amplifier should be tristateable so that the communication line may only be loaded when the node is transmitting. The Transmitter 18 is "tristateable" in that circuitry is associated with the Transmitter amplifier that disconnects the Transmitter amplifier from the coupling network when the Transmitter 18 is not enabled. This is necessary in order to present a high impedance to the powerline media 12 when the node is not transmitting. The Transmitter amplifier also includes circuitry to limit the time that the Transmitter 18 can be active. The Transmitter filter 18 is designated to filter high frequency harmonics (above around 400 kHz) from being coupled onto the powerline so as to reduce superious transmissions. The bandwidth of the Transmitter filter is preferably around 100 kHz, preferably allowing frequencies in the approximate range of 40 kHz to 140 kHz to pass.

As noted above, information travelling to and received from the powerline communication media 12 passes through the Transmitter Control and Modulator 104 and the Receiver Control and Demodulator 102. The process of transforming the baseband serial data into carrier based data is referred to as modulation. Similarly, the process of transforming carrier data into baseband data is referred to as demodulation.

Figure 2:
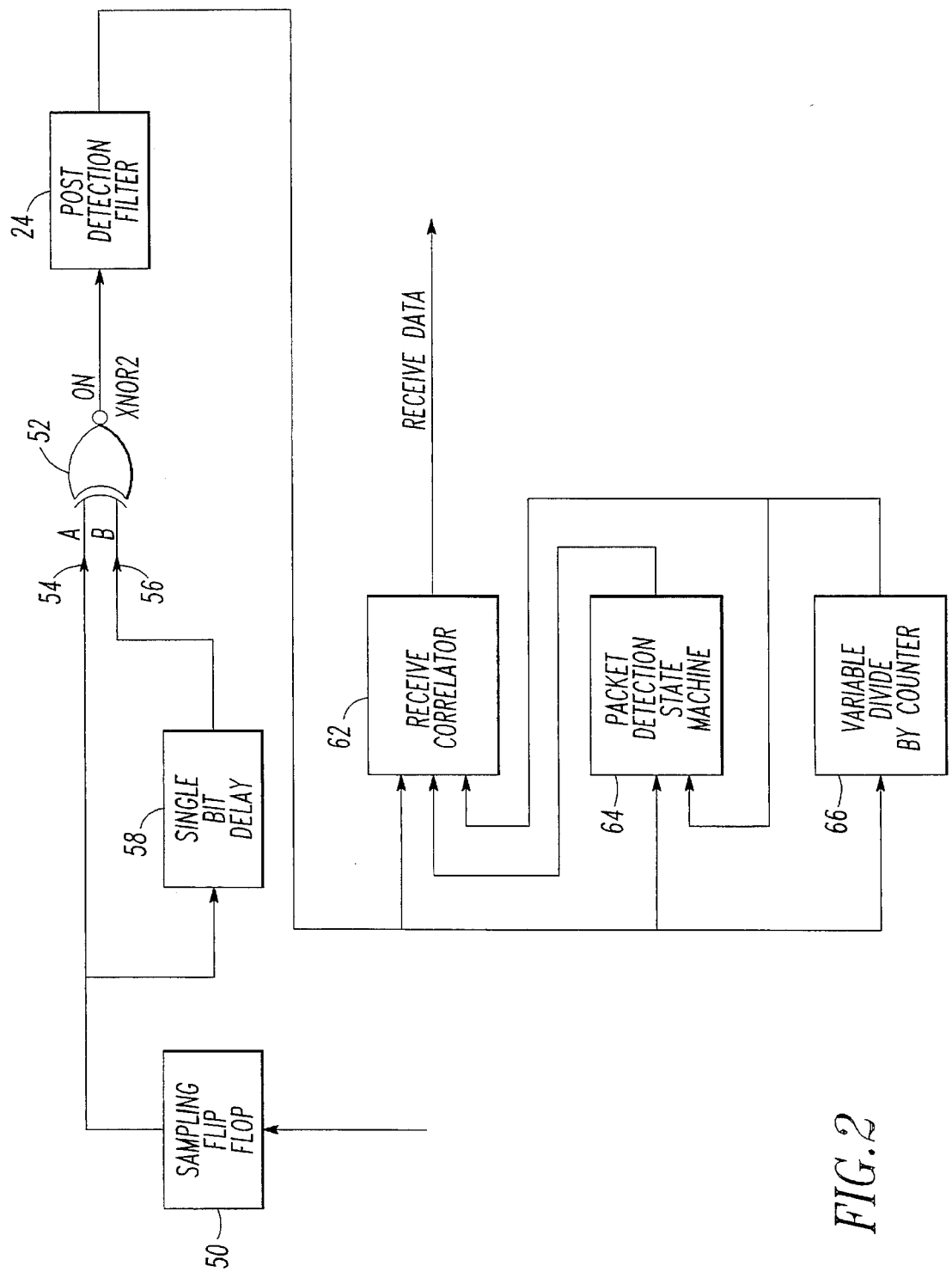
FIG. 2 is a functional block diagrammatic view of the preferred demodulator utilized by the preferred controller.

A block diagram representing the demodulation hardware is given in FIG. 2. The received carrier signal is applied to a sampling Flip Flop 50. The output of the sampling Flip Flop 50 is split with part going to a "one bit delay" 58 and part going to a first input 54 of a two input XNOR gate 52. The second input 56 of the XNOR gate 52 is connected to the output of the "one bit delay" 58. The one bit delay is implemented through the use of a multi-element shift register. Carrier phase resolution requires that the shift register consist of a minimum of thirty-two elements. The present demodulation process utilizes forty elements.

Thus, a "present" bit and a "previous" bit are both input to the XNOR gate 52 and compared. The XNOR gate 52 output is a logical "1" if the received carrier is in phase with the received carrier during the previous bit time. The XNOR gate 52 will output a logical "0" if the present carrier is out of phase with the carrier during the previous bit time.

Thus, the output of the XNOR gate 52, in an ideal, noise free environment, is representative of the original HDLC transmitted data. The realities of the powerline carrier environment necessitate additional processing of the demodulated data. This processing is required to recover data in the presence of powerline anomalies. The hardware is configurable, thus the modulation/demodulation approaches can be changed in the same hardware. The carrier cycles per bit may be changed with the same hardware thus allowing the Controller 10 to adapt to various powerline noise situations.

The demodulation process also utilizes a correlator 62, a state machine 64 and a variable counter 66 in combination. The state machine 64 has a first state which is an idle state indicating that no "0"s have been received. When a "0" is received, there is a state of looking for fourteen consecutive "0"s. Anytime a "1" is received during that period of time, the state machine returns to the idle state until a "0" is received. Once fourteen consecutive "0"s are received, the state machine enters a state of looking for a "1". Having detected the "1", the state machine enters a state where it looks for six consecutive "1"s. If the six consecutive "1"s are received, the next bit must be a "0". Once that next "0" is received, the preamble is recognized and indicates the packet body. The information that follows is the packet body until either a flag character or an abort sequence (either one being defined by six consecutive "1"s) is received. That marks the end of the message, and the state machine is returned to the idle state again.

The receive correlator 62 looks for fourteen consecutive "0"s during the preamble recognition time. Any transition to a "1" during this preamble recognition phase is an invalid data value. Then, during the FLAG recognition period where it is looking for the "1"s, if a "0" is received, that "0" would be considered an invalid data value for that period of time. Once the FLAG has been recognized so that the data stream is determined to be into the packet body, bit synchronization is achieved.

The variable divide-by counter 66 counts at forty times the bit rate and since there are four carrier cycles per bit, the counter 66 counts at ten times the carrier rate. The counter 66 is variable so that when it is desired to resynchronize, a count may be subtracted or added to that counter 66 so as to divide by thirty-nine or divide by forty-one. Thus, the counter 66 can divide by thirty-nine, forty or forty-one for a given bit period. When in synchronization, the count is divided by forty. When it is desired to increase the speed of the oscillator, the count is divided by thirty-nine. When it is desired to decrease the speed of the oscillator, the count is divided by forty-one. Resynchronization occurs when there is a phase change in the carrier cycle from data bit to data bit, with such phase shift being designated a logical "0". A "window" is selected, and if the closing transition is before this selected time or after this selected time, then a count is added or subtracted from the count. That allows synchronization to be maintained during the packet. The counter 66 looks at the output of the post detection filter 24 and if that value is a "1" the counter 66 counts for that period of time that it is "1" and determines whether the bit was in fact a "1". If it was a "1" for a majority of the data bit interval, then the bit is considered to be a "1". If the bit is a "0" for the greater portion of the data bit interval, the bit is considered a "0". A count of forty, which is the variable counter period, is used for making that determination. The counter 66 thus acts as an integrator. The length of time that the data is a logical "0" is counted and compared versus the length of time that the data is a logical "1".

The Post Detection Filter 24 is RC filtering which filters output from the Demodulator 102. Two additional elements are involved with "post detection" processing. First, the data is filtered as illustrated by the functional block labeled Post Detection Filter 24 in FIG. 2. A simple two stage RC filter is used for this purpose. The time constant for each stage is set to approximately one quarter of the bit time. Total post detection filtering time constant is thus one-half the baseband data bit time. The Post Detection Filter 24 removes the high frequency noise content of the demodulated data resulting from differences in bit-to-bit carrier phase inaccuracies. Secondly, the output of the filter is further processed using a simple correlator 62. The output of the correlator 62 provides the recovered, demodulated, HDLC data.

Figure 4:
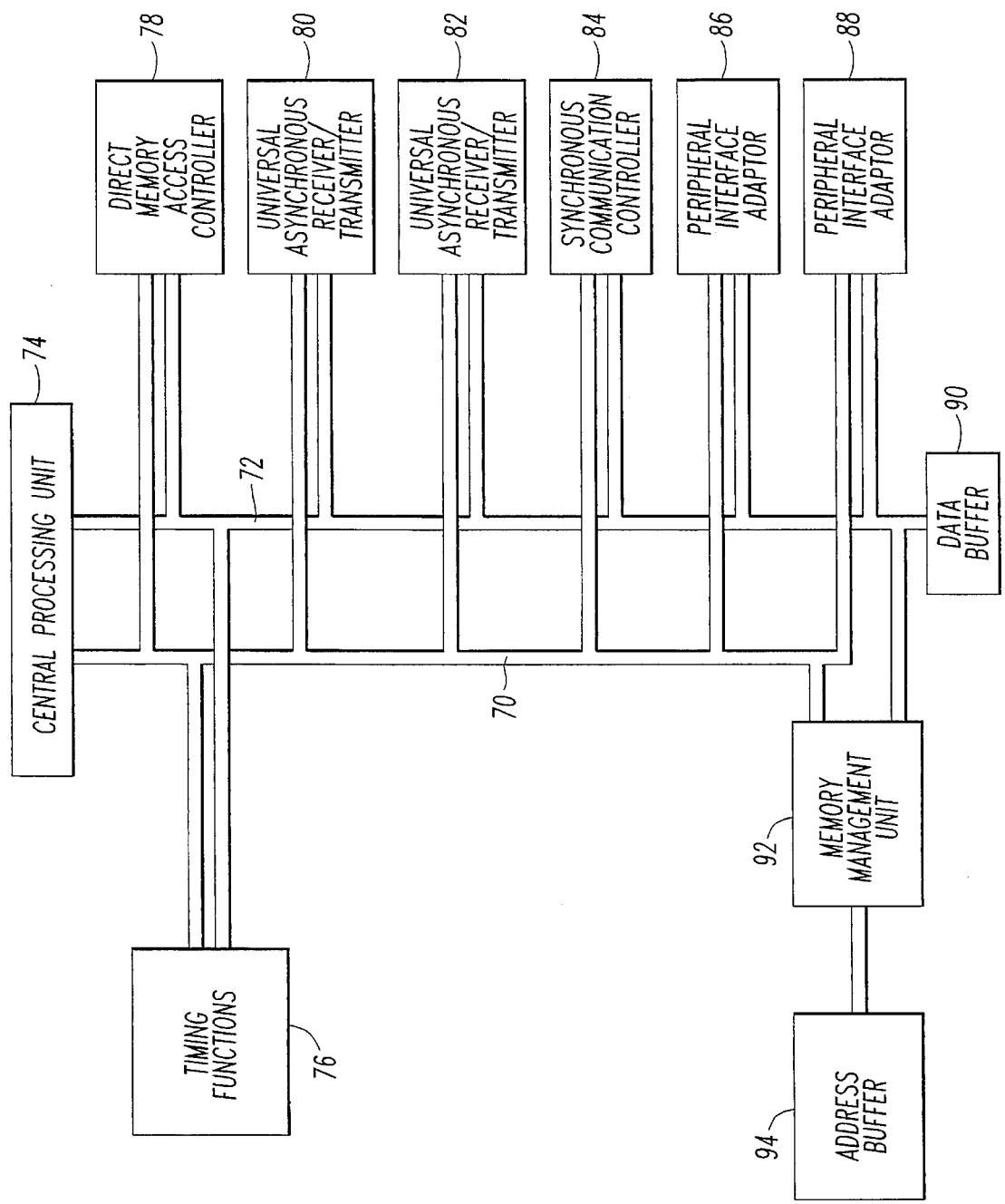
FIG. 4 is a functional block diagrammatic view of the preferred communication microprocessor utilized by the preferred controller.

A Zilog Z80181 (Z181) super integrated microprocessor serves as the preferred Communication Microprocessor 26 of the LAN Controller 10. A functional block diagram of the microprocessor is shown in FIG. 4. Thus, referring to FIGS. 1 and 4, the Communication Microprocessor 26 serves as a bridge between the host (digitized) environment and the powerline media environment. The Communication Microprocessor 26 preferably is an 8-bit MPU that is particularly well suited for use as the processing element within the LAN Controller 10. The Communication Microprocessor 26 includes all the basic communication peripherals necessary for implementing the LAN Controller communication ports (i.e., the host port 34, the diagnostic portion 36, and any other ports which may be connected to the Communication Microprocessor 26). These peripherals include two Universal Asynchronous Transmitter and Receiver (UART) peripheral devices 80, 82, a Synchronous Communications Controller (SCC) 84, and a Direct Memory Access (DMA) controller 78. The Communication Microprocessor 26 also includes Timing Function Components 76. The Timing Function Components 76 include a timing generator, programmable reload timers and a counter timer controller that collectively control when the Communication Microprocessor 76 conducts functions.

One Communication Processor UART 80 implements the host port serial interface. The normal communication parameters, including data rate, number of stop bits, and parity associated with this port are configurable. The host port interface supports full duplex operation. Data received at the host port 34 is packetized and transmitted to other network nodes via the powerline media 12. The packetization process is triggered by either reception of a complete buffer of data, or by exceeding an elapsed time threshold. The communication buffer size is preferably set to 50 bytes. Multiple communication buffers are implemented within the controller read-write memory. Filling a buffer results in the contents of the buffer being transmitted via the powerline media 12. Additional data received via the host port 34 is transferred to the next available receive buffer. The elapsed time threshold is equal to the time required for reception of one byte of data via the host port 34. Reception of a byte of data at the host port 34 results in re-initiation of the elapsed time counter. Transmission of the receive buffer commences when the elapsed time threshold is exceeded. Efficient shared media usage with this transmission methodology requires a data highway protocol that allows for variable size highway packets. The HDLC protocol inherently includes this feature.

The second Communication Processor UART 82 implements the serial interface for diagnostic functions. A listing of the functions that are accessible through this port are:

1. Download firmware to the microprocessor flash memory's erasable, programmable, read only memory (EPROM).

2. Download firmware to the microprocessor data and buffer memory's random access memory (RAM).

3. Initiate execution of RAM resident firmware.

4. Interrogate node communication parameters.

5. Interrogate microprocessor data.

6. Set node communication parameters.

7. Interrogate node port communication performance data.

The above functions are preferably part of the second UART 82 but could alternatively be accessed through the powerline media 12 or the host communication port 34. The diagnostic functionality is determined by the Controller resident firmware. As such, these features may be changed to satisfy differing applications. This could include making the second port an additional host port instead of a diagnostic port 36.

The Communication Microprocessor 26 has a Synchronous Communication Controller (SCC) 84 that is used to provide an interface for HDLC data between the Communication Microprocessor 26 and the Modulator/Demodulator and Media Access Control 22. The SCC 84, contained within the Communication Microprocessor 26, provides the actual data interface associated with the powerline media 12, including implementation of the HDLC protocol. The SCC 84 involves two signals for transmit, serial data and serial clock. The output of the Demodulator 102 is serial data. Two signals are also involved with receive mode operation, receive data and receive clock. The variable counter 66 generates both the clocks for the transmit/modulation process and receive/modulation process. This permits the powerline carrier for the communication software to be independent of actual powerline data rate, i.e., the communication software does not need to program the communication bit rate for the SCC 84. The data highway operates strictly in a half duplex mode. Only one network node can transmit at any given point in time. The data that comes across the SCC 84 is HDLC data with the preamble information stripped off by the Demodulator 102, so that the data and clock are provided to the Communication Microprocessor 26 in the receive mode. In the transmit mode, clock is provided to the Communication Microprocessor 26 and the Communication Microprocessor provides the data in an HDLC format.

The Communication Microprocessor 26 also utilizes a Direct Memory Access (DMA) controller 78. The DMA controller 78 is an integral part of the interface between the powerline carrier 12 and the Communication Microprocessor 26 and facilitates the actual transfer of data between microprocessor memory and the SCC 84. This is accomplished without byte by byte microprocessor intervention. One channel of the DMA controller 78 is used to automatically transfer received data from the SCC 84 to the current receive buffer in RAM. The other DMA controller channel is used in transmit mode to automatically transfer data from the current highway transmit buffer to the SCC 84 for transmission over the powerline carrier. This implementation significantly reduces the processing requirements placed on the Communication Microprocessor 26.

The Communication Microprocessor 26 also has a Memory Management Unit 92 so that approximately one megabyte of memory may be addressed from the Communication Microprocessor 26. The Communication Microprocessor 26 includes the capability of addressing a megabyte of memory which implies the use of 20 address lines. The Communication Microprocessor 26 itself utilizes a 16 line address register. Thus, the Memory Management Unit 92 allows the sixteen address lines to be mapped to twenty address lines.

The Communication Microprocessor also includes Peripheral Interface Adaptors 86, 88. The Peripheral Interface Adaptors 86, 88 provide direct control outputs from a Central Processing Unit 74 to the Modulator/Demodulator and Media Access Control 22 and also senses the states of status inputs received from the Modulator/Demodulator and Media Access Control 22. The Central Processing Unit 74 is that portion of the Communication Microprocessor 26 that performs the instruction execution. The general operation of central processing units and peripheral interface adaptors are known in the microprocessing industry.

Flash memory 28, which is connected to the Communication Microprocessor 26, is a form of nonvolatile memory that is programmable in the system. The 128 k byte Flash memory device 28 contains the Controller constants (i.e., buffer sizes and other constant valves utilized by the Communication Microprocessor 26) and execution firmware. The Flash memory 28 provides non-volatile program execution storage, and is used instead of a one time programmable EPROM. The re-programmable nature of the Flash memory 28 greatly extends the functionality of the Controller 10. For example, the Flash memory 28 may be reprogrammed with operating firmware to be down loaded through the diagnostic port 36 or over the powerline carrier 12. The Flash memory 28 also stores the configuration data used to program the Modulator/Demodulator and Media Access Control 22. The Communication Microprocessor 26 reads this data from the Flash memory 28 and programs the Modulator/Demodulator and Media Access Control 22 each and every time a Controller reset occurs. The ability to download this information, and program the Flash memory 28 provides the capability of modifying hardware functionality without changing the actual operating hardware.

The circuitry associated with the Communication Microprocessor 26 includes a 256 byte EEPROM which is labeled as Non-Volatile Configured Memory 32 in the block diagram of FIG. 1. This EEPROM provides non-volatile information storage for the Controller 10. The information stored here includes communication configuration parameters for the host port 34, node address, and parameters specifically related to Media Access Control (MAC) 100. The parameters for the MAC 100 include information to identify the mode of network topology operation. The EEPROM stored information could also include a controller serial number field. This would allow identification of every controller manufactured, and would facilitate tracking controllers through the manufacturing and life cycle process. A 32 k byte static random access memory (RAM) is directly connected to the Communication Microprocessor 26 and is labeled as Data and Buffer Memory 30 in the block diagram of FIG. 1. This device serves as the Communication Microprocessor read-write memory, and is used for data storage during program execution. The RAM memory is not backed up by a battery, therefore, data stored within the device is lost when power to the Controller 10 is turned off. The communication buffers are also implemented within this RAM memory.

The Communication Microprocessor 26 has parallel ports which can perform bit type operations directly without the need for extra hardware. The Controller 10 implements serial communication through preferably two ports: a diagnostic port 36 and a host port 34. Each of the ports 34, 36 preferably connects to a respective Communication Line Transceiver 38, 40. The host port 34 and diagnostic port 36 are used for communication with the external host environment via the respective Communication Transceivers 38, 40. The host port and diagnostic port electrical interfaces conform to either EIA RS232 or EIA RS485 specifications. Electrical signal level translation is accomplished within the Communication Line Transceivers 38, 40. Both the host and diagnostic ports 34, 36 utilize a RJ45, 8-pin modular connector, for cable connection.

The Communication Line Transceivers 38, 40 perform the function of converting from RS232 signal levels to preferably 5 Volt logic signal levels. This is because RS232 signals typically operate in a range of from +10 Volts to −10 Volts, which is outside the range associated with logic signals. The preferred logic signal level is between zero and 5 Volts. Also, the RS232 signals involve an expanded noise margin, thus the signal must be converted. The diagnostic port 36 is used to download new information to program the Flash memory 28 to be able to set the specific information that is unique to that particular node and that is stored in the nonvolatile memory such as serial number, manufacturing information, etc. This information is useful to allow tracking of the controllers during manufacturing, testing and deployment.

Operation of the preferred Controller 10 will now be described. The HDLC protocol requires assignment of an address to each network node. Multiple nodes may have the same address. The host device associated with a node only receives data when the contents of the address field of a packet match either the node address or a special broadcast address. All devices associated with a given master in multiple master-slave networks are assigned the same network address. This address becomes the group address.

The HDLC frame format is:

| Opening Flag | HDLC Address | Control | Data | CRC | Closing Flag |
|---|---|---|---|---|---|
| one byte | one byte | variable length | variable length | two bytes | one byte |

Thus, the HDLC frame includes an opening FLAG, data and a closing FLAG. The "packet" is the frame plus a preamble. The significant issue with regard to the HDLC frame is that the control field can include a sub-addressing capability. Node sub-addresses can then be assigned to such things as host ports and diagnostic functions. Implementing these functions through the use of a second communication port has the advantage of not impacting network performance. No additional demand is placed on the communication media for diagnostic related operations.

Information received via the powerline media 12 is checked for communication errors. The Address field of an error free packet is compared with the node and broadcast addresses to determine if the packet is directed to the node. The error free data is de-packetized and transmitted to the host that corresponds with the packet address field content.

Carrier based communications systems that involve multiple transmitters, such as the preferred system, require a mechanism for bringing the receiver into synchronization with the transmitted data sequence. This synchronization is accomplished with the use of a packet preamble. The preamble serves as a signal to the receiver that a packet of information is being sent. The preamble consists of a specific data sequence which facilitates carrier detection and synchronization. The packet preamble definition is an integral part of the preferred modulation system, and is particularly tailored for use with HDLC frames and DPSK modulation.

In Differential Phase Shift Keyed (DPSK), as employed in the preferred system, the phase of the carrier is shifted by plus or minus π/2 radians, depending on whether the data bit is a logical "0" or a logical "1". There is no absolute relationship between the phase of the carrier signal and the baseband data. Rather, the shift in phase of the carrier frequency occurs with each "0" data bit.

Phase shifts in the carrier represent bit boundaries in the data stream. Bit boundaries facilitate the initial synchronization during the packet preamble and facilitate re-synchronization during the packet body. The specific packet preamble along with the use of HDLC and DPSK modulation with phase changes on every "0" bit is significant to the demodulation system. The preamble is a series of phase change consecutive "0"s followed by a no phase change transition. Immediately after that transition is the FLAG character. The FLAG character cannot be included within the packet body because of the specific data encoding within the packet body that prevents transmission of more than 5 consecutive "1"s. Six or more consecutive "1"s is either inferred as the beginning of a FLAG or as a packet ABORT sequence. The combination of HDLC and DPSK modulation with phase changes on every "0" results in a system that can maintain synchronization regardless of transmission data content.

During the first part of the preamble, which is the transmission of the "0"s (representing phase changes), synchronization is achieved by a time delay. A time delay is the time during which coherent phase changes are received for a certain period of time required to transmit a given number of data bits. Both bit and byte synchronization are provided by receiving a long period of coherent phase changes representing zeros, then a time at which there is no phase change is received and that marks the first "1" which is transmitted as a part of the FLAG character. That point in time allows bit synchronization. The six consecutive ones followed by a "0" that are then received allow byte synchronization as this sequence is the known definition of the FLAG character. So after receiving the FLAG character, synchronization is assured and the rest of the data is then received.

As noted above, implicit with the HDLC protocol is the condition that the transmit data sequence within a frame will never consist of more than five consecutive "1"s. HDLC uses a process called "bit stuffing". Thus, if the Transmitter 18 begins to send a character other than the FLAG character or an abort sequence that is six or more consecutive "1"s, the HDLC Transmitter 18 will automatically insert a "0" after 5 consecutive "1"s. The receiver then automatically removes the inserted "0". The DPSK modulation scheme used with the HDLC protocol ensures that the Receiver 20 becomes re-synchronized at least every 6 bits. As such, bit synchronization with arbitrary data and variable length packets can be easily maintained.

The transmit operation involves both the Communication Microprocessor 26, and the logic implemented within the Modulator/Demodulator and Media Access Control 22. The Communication Microprocessor SCC 84 actually transmits the HDLC data in cooperation with conditions controlled by logic within the Modulator/Demodulator and Media Access Control 22. Three separate intervals are involved with transmission of an HDLC frame. First, the Controller 10 must obtain access to the powerline media 12. Next, the beginning part of the packet preamble must be transmitted, and finally, the HDLC frame is transmitted. Obtaining access to the network powerline media 12 is a function of the Media Access Control 100. The operation of the Media Access Control 100 is described in greater detail in copending application Westinghouse Electric Co. Case No. 58,534 incorporated herein by reference.

The transmission of an HDLC frame proceeds according to the sequence that follows. It should first be noted that in the transmit idle state, the Communication Microprocessor SCC continuously transmits FLAG characters. The FLAG character is a special sequence of data that cannot occur within the frame body. This sequence is a hexadecimal 7E byte, "01111110" binary. An HDLC transmitter will never transmit more than 6 consecutive "1"s at any point in time and if the receiver ever senses more than 6 consecutive "1"s then it aborts the received message sequence. Note that the bit stuffing concept previously discussed would force a 7E data byte to be transmitted as the following binary sequence, "011111010."

Referring next to FIG. 3, the signals and information communicating between the various functional components which contribute to the Modulator/Demodulator and Media Access Control 22 will be described. The received carrier signal 110 travels to the Receiver Control and Demodulator 102. A received signal 116 is sent from the Receiver Control and Demodulator 102 to a post detection filter (not shown in FIG. 3) where it is filtered and returned as a filtered signal 118 and is input back into the Receiver Control and Demodulator 102. A received data signal 112 and a received clock signal 114 are each sent from the Receiver Control and Demodulator 102 to the SCC (not shown in FIG. 3).

A transition detection signal 120, a packet detection signal 122 and a hunt signal 124 are forwarded from the Receiver Control and Demodulator 102 to the variable counter 66. The hunt signal is enabled once the correct number of "0"s in the preamble are detected so that the transition "1" is now being looked for to indicate the FLAG.

A communication clock signal 126 is provided from the variable counter 66 to the Receiver Control and Demodulator 102 and to the Transmitter Control and Modulator 104. This clock signal is used by the Modulator 104 and Demodulator 102 for shifting data. A carrier signal 128 that is to be modulated is directed from the variable counter 66 to the Transmitter Control and Modulator 104. A data signal 130 received from the SCC is then input to the Transmitter Control and Modulator 104.

A request to send signal 132 is input to the MAC 100 from the Communication Microprocessor (not shown in FIG. 3). Also input to the MAC 100 is information from the address bus 70 and the data bus 72. The MAC 100 then generates a transmit request signal 136 that is input to the Transmitter Control and Modulator 104. A clear to send signal 144 is then output from the Transmitter Control and Modulator 104 which is sent to the transmitter and is also input to the MAC 100 and to the Communication Microprocessor through the Peripheral Interface Adaptor.

A signal 138 to disable the MAC 100 is input from the MAC 100 to the Transmitter Control and Modulator 104. A transmit closing FLAG signal 140 is also provided from the Transmitter Control and Modulator 104 to the MAC 100. Also input to the transmitter from the Transmitter Control and Modulator 104 is a transmit carrier signal 146. A transmitter enable signal 142 is sent to the transmitter and is also sent to the variable counter 66 and to the Receiver Control and Demodulator 102.

The Communication Microprocessor 26 asserts a request to send signal 132 and then waits to receive a clear to send signal 144. As described above, this occurs in stages: when the MAC 100 receives a request to send signal 132 the MAC generates a transmit request signal 136 which is input to the Transmitter Control and Modulator 104, which then forwards a clear to send signal 144 to the Communication Microprocessor and to the MAC 100. The SCC 84 continues to transmit HDLC FLAGs during this waiting period. The MAC 100 determines that the network is idle, and the Transmitter Control and Modulator 104 begins generating a carrier signal 146 and a signal 142 that enables the Transmitter amplifier. This marks the beginning of preamble transmission. The transmit logic of the Transmitter Control and Modulator 104 thus forces the generation of a minimum of sixteen consecutive "0"s, and then waits until the SCC output data signal line is at logical "0". The Transmitter Control and Modulator 104 then asserts the clear to send signal 144. This process ensures that a complete FLAG character will be transmitted by the SCC 84 before beginning transmission of the actual data.

The state machine 64 becomes synchronized with the FLAG character transmission, and checks to verify that a non-FLAG byte is transmitted. This is necessary to determine the end of the frame, which is indicated by the transmission of first FLAG following transmission of a non-FLAG character. The end of frame transmission can also be indicated by the abort sequence. Transmission of more than six consecutive "1"s aborts a message. In either case, the logic of the Media Access Control 100 will disable the Transmitter 18 and stop generating the carrier signal within a byte time after detection of the condition that marks the end of transmission.

The present controller is incorporated in a network communication method that includes the demodulation approach and extends to the packet preamble definition. The preamble is specifically defined to consist of a minimum of sixteen consecutive "0"s. The preamble is followed by the HDLC frame opening FLAG. This sequence in conjunction with DPSK modulation based on phase changes for every "0" greatly enhances preamble and start of message recognition.

First, a preamble consisting of a string of consecutive "0"s implies that a counter (that is reset whenever the filtered, demodulated data becomes a logical "1") provides a mechanism for preamble detection. However, a sequence of consecutive data, of itself, is not sufficient for robust operation. DPSK modulation with phase changes associated with every "0" allows this consecutive data string to be used as an effective preamble. This is because a phase change must be associated with every raw data bit during the consecutive data string. Transmission of a minimum of sixteen consecutive "0"s along with the constraint that the receiver must receive a minimum of fourteen consecutive "0"s has resulted in very robust preamble detection. This preamble approach is much less error prone than carrier synchronization based approaches.

The next significant step in the reception process centers on achieving bit and byte synchronization. The packet preamble is immediately followed by the HDLC FLAG character. The beginning "0" to "1" data transition of the FLAG character, after receipt of the fourteen consecutive "0"s, provides a criterion that permits simultaneously achievement of bit and byte synchronization. Proper synchronization is verified by the fact that six consecutive "1" must be received following the consecutive sequence of "0"s, and these "1"s must then be followed by a "0."

Reception of the first non-FLAG character following the above sequence marks the beginning of the actual HDLC frame data. Completion of the frame data is indicated by either of two conditions: (1) reception of a FLAG character; or (2) by reception of more than six consecutive "1"s. The later is referred to as the ABORT sequence.

The above description indicates that there are three operating states involved with reception of a frame. The first state is associated with preamble recognition. The second state is associated with FLAG recognition. The third state is associated with reception of the frame-body which includes the closing FLAG. Different factors are used in determining the actual logical state of data resulting from the basic demodulator. These factors are dependent on the receiver operating state.

A special circuit, referred to a "'1's catcher" which is functionally part of the receive correlator is used during the preamble period to determine that a logical "1" is not present in the received data stream. The output of the Post Detection Filter provides the input to the "1"s catcher. As the name implies, if the input to this detector becomes a logical "1", the output of the detector will become a logical "1", and will remain at this level until reset.

This detector is reset at the beginning of each implied receiver bit time period. This process does not require synchronization with the received carrier. Instead, the fact that the post detection filtered data has not become a logical "1" anytime during a bit time is observed. The circuit counts the consecutive bit times during which the post detection filtered data has not become a logical "1". The FLAG recognition state is entered if the post detection filtered data has not become the logical "1" for fourteen consecutive bit times.

The FLAG recognition state specifically looks for the "01111110" binary data sequence. The logical "0" to logical "1" transition in post detection filtered data synchronizes the local carrier generator with the received carrier. This transition also resolves the bit and byte boundaries. Bit synchronization allows the received filtered data to be digitally integrated. The integrated value, at the end of the bit interval, determines the logical level of the received data bit. Two integration threshold values are involved in making the data bit value correlation. During the initial FLAG recognition state the post detection filtered data must be at the logical "1" level for more than ¾ of the bit interval before the corresponding data bit are considered a logical "1". The receiver returns to the preamble recognition state if a logical "0" is detected during the time that the consecutive "1"s are expected.

As previously discussed, the receiver enters the frame-body state with reception of a FLAG following the preamble. During this state, the post detection filtered data must be at the logical "1" level for more than ½ the bit interval before the corresponding data bit is considered a logical "1". The receiver remains in the frame-body state until a closing FLAG is received. Byte synchronization is essential during the frame-body state because multiple FLAG characters can be received at the beginning of the frame body. It is therefore necessary to recognize that a non-FLAG character has been received before a FLAG character is determined to be a closing FLAG.

The received demodulated data cannot be directly passed to the Communication Microprocessor SCC. Data patterns due to powerline anomalies during the preamble recognition state could result in the incorrect recognition of a FLAG character. This would result in the SCC receiver falsely starting frame reception, and would result in a significant increase in communication errors. The SCC received data is therefore forced to the logical "1" state until the FLAG recognition state is active. This results in the abort sequence of data being sent to the SCC 84 until the beginning of the FLAG character is received.

While certain present preferred embodiments have been shown and described, it is distinctly understood that the invention is not limited thereto but may be otherwise embodied within the scope of the following claims.

We claim:

1. A method of demodulating an HDLC data body which had been modulated through differential phase shift keyed modulation, the method comprises the steps of:

sampling the data body in a sampling flip-flop which splits the data body into first and second identical portions;

inputting the first portion of the data body into a single bit digital delay circuit which outputs a previous binary data bit;

inputting the second portion of the previous binary data bit into a first input of an XNOR circuit;

inputting the data body directly into a secure input of the XNOR circuit so that of the data body, a present data bit and a previous data bit are compared by the XNOR circuit and when the previous binary data bit and the next consecutive binary data bit have unlike phases the XNOR circuit outputs a first binary data bit value, and when the previous binary data bit and the next consecutive binary data bit have like phases, the XNOR circuit outputs a second binary data bit value.

2. The method of claim 1 further comprising the step of inputting the demodulated data into a post detection filter.

3. The method of claim 2 wherein the post detection filter comprises a two stage RC filter.

4. The method of claim 3 wherein the filter has a time constant for each stage of approximately one-quarter bit time.

5. The method of claim 2 further comprising the step of processing the demodulated data through a receive data correlator, a data body state machine and a variable divide counter.

6. The method of claim 5 wherein the sampling flip-flop, the delay circuit, the XNOR circuit, the port detection filter, the correlator, the state machine and the adaptor are incorporated within a field programmable gate array.

7. The method of claim 1 wherein the single bit delay is comprised of a shift register having at least thirty-two elements.

8. The method of claim 7 wherein the single bit delay is comprised of a shift register having forty elements.

9. The method of claim 1 wherein the sampling flip-flop, the delay circuit and the XNOR gate are provided within a field programmable gate array.

10. The apparatus of claim 1 wherein the delay circuit comprises a shift register having at least thirty-two elements.

11. The apparatus of claim 1 wherein the sampling flip-flop, the delay circuit and the XNOR circuit are incorporated within a field programmable gate array.

12. An apparatus for demodulating an HDLC data body which had been modulated by Differential Phase Shift Keyed modulation comprising:

a sampling flip-flop which splits the data body into first and second identical portions;

a single bit digital delay circuit that receives a binary data bit from the first data body portion and outputs a delayed binary data bit;

an XNOR circuit having first and second inputs in which a present binary data bit from the second data portion is input into the first XNOR circuit input and the delayed binary bit is input into the second XNOR circuit input, and wherein the XNOR circuit outputs a first binary data bit value when the present binary data bit and the delayed binary data bit have unlike phases, and wherein the XNOR circuit outputs a second binary data bit value when the present binary data bit and the delayed binary data bit have like phases.

13. The apparatus of claim 12 further comprising a post detection filter for filtering data that is output from the XNOR circuit.

14. The apparatus of claim 13 wherein the post detection filter comprises a two stage RC filter.

15. The apparatus of claim 14 further comprising a receive data correlator, a data body state machine and a variable divide counter for providing a received data signal from the filtered data received from the post detection filter.

16. The apparatus of claim 15 wherein the sampling flip-flop, the delay circuit, the XNOR circuit, the post detection filter, the correlator, the state machine and the counter are incorporated within a field programmable gate array.

* * * * *